(12) United States Patent
Cotaie et al.

(10) Patent No.: US 11,816,210 B2
(45) Date of Patent: Nov. 14, 2023

(54) RISK-BASED ALERTING FOR COMPUTER SECURITY

(71) Applicant: Adobe Inc., San Jose, CA (US)

(72) Inventors: Andrei Cotaie, Popesti Leordeni (RO); Vivek Malik, Milpitas, CA (US); Tiberiu Boros, Bucharest (RO); Nicolas Pachis, San Jose, CA (US); Lauren Park, Redwood City, CA (US); Kumar Vikramjeet, San Jose, CA (US)

(73) Assignee: Adobe Inc., San Jose, CA (US)

( * ) Notice: Subject to any disclaimer, the term of this patent is extended or adjusted under 35 U.S.C. 154(b) by 236 days.

(21) Appl. No.: 17/208,624

(22) Filed: Mar. 22, 2021

(65) Prior Publication Data
US 2022/0300609 A1 Sep. 22, 2022

(51) Int. Cl.
*G06F 21/55* (2013.01)
*G06F 16/245* (2019.01)
*G06N 20/00* (2019.01)

(52) U.S. Cl.
CPC .......... *G06F 21/554* (2013.01); *G06F 16/245* (2019.01); *G06N 20/00* (2019.01); *G06F 2221/034* (2013.01)

(58) Field of Classification Search
CPC ................. G06F 21/554; G06F 16/245; G06F 2221/034; G06N 20/00
See application file for complete search history.

(56) References Cited

U.S. PATENT DOCUMENTS

| 11,675,816 B1* | 6/2023 | Chandrasekharan ........................ G06F 16/285 707/737 |
| 2010/0064368 A1* | 3/2010 | Stolfo ................. H04L 63/1416 726/24 |
| 2015/0030313 A1* | 1/2015 | Tammisalo ............. G06F 16/30 386/278 |

(Continued)

OTHER PUBLICATIONS

Tovar, Alvaro. "Negative log likelihood explained." Medium: Deep learning made easy, Aug. 13, 2019. Retrieved from the Internet < URL: https://medium.com/deeplearningmadeeasy/negative-log-likelihood-6bd79b55d8b6> (Year: 2019).*

*Primary Examiner* — Chau Le
*Assistant Examiner* — Zhe Liu
(74) *Attorney, Agent, or Firm* — Finch & Maloney PLLC

(57) ABSTRACT

A dynamically generated search query is generated based on rarity scores associated with raw-level computer events. Event data is pre-processed using historical information about the frequency, or rarity, of instances of individual events. Each event is assigned one or more labels that identify the event based on the historical information. The rarity scores represent probabilities of events occurring with the same labels. The rarity scores are associated with n-grams of the labels (e.g., a combination of two labels, three labels, etc.). A label n-gram score is calculated based on newly observed events and the rarity scores corresponding to the label n-grams. The search query is generated based on the label n-gram score. The search query is executed against a database to retrieve information, such as diagnostics, used to alert an administrator to events that are potentially anomalous.

20 Claims, 8 Drawing Sheets

(56) References Cited

U.S. PATENT DOCUMENTS

| | | | |
|---|---|---|---|
| 2015/0161394 A1* | 6/2015 | Ferragut | H04L 9/3273 |
| | | | 726/25 |
| 2018/0124072 A1* | 5/2018 | Hamdi | G06F 11/3428 |
| 2018/0302423 A1* | 10/2018 | Muddu | G06F 16/24578 |
| 2019/0394220 A1* | 12/2019 | Gupta | G06F 18/24 |
| 2021/0089649 A1* | 3/2021 | Subramanyam | G06F 21/552 |
| 2022/0245342 A1* | 8/2022 | Shah | G06F 16/35 |

* cited by examiner

RISK-BASED ALERTING FOR COMPUTER SECURITY

FIELD OF THE DISCLOSURE

This disclosure relates generally to the field of computer security, and more particularly, to techniques for risk-based alerting.

BACKGROUND

In complex computing environments, defining and detecting anomalies that represent possible security threats is a complex task. For example, regular maintenance of many infrastructures usually occurs through a combination of automated events and normal operational activity, such as users connecting to terminal services and executing commands that generate additional events. Because an anomaly can occur with, for example, an executed command-line on a server/workstation or a process accessing a file and exposing its content, there is a high chance of confusing regular maintenance-based operational commands with malicious or anomalous commands.

Security information and event management (SIEM) is a computer security platform that provides real-time analysis of security-related events generated by applications and hardware operating on the network being monitored. SIEM combines security event management (SEM), which is used to provide threat monitoring, event correlation, and incident response, and security information management (SIM), which is used to analyze log and performance data. SIEM collects logs and information from an infrastructure and to help analysts corelate that data, leading to human-understandable alerts. The process of generating alerts implies prior domain knowledge and expectations about what malicious activity looks like. This translates into a static set of rules that control how a given security platform reacts to possible malicious activities. While such security platforms are somewhat effective at reducing false positives, they suffer from being based on the static set of rules. Specifically, existing platforms are incapable of dynamically updating those rules in response to changes in the various relevant factors and their relationships that make up the ever-changing landscape of a given modern enterprise infrastructure.

SUMMARY

Techniques are provided for risk-based alerting. A dynamically generated search query is generated based on rarity scores associated with raw-level computer events. In more detail, event data is pre-processed using historical information about the frequency, or rarity, of instances of individual events either by using information about the frequency, or rarity, of instances of individual events or by describing text-based content of the event using language models and then analyzing the perplexity of the events based on past observations. Each event has one or more attributes, such as a timestamp, a process name, a user, a command-line, etc. Each event is assigned a set of labels that identify the event based on the rarity or frequency at which the attributes have been observed for that event. For example, a single observation of a specific command-line can be assigned a set of labels, such as RARE_USER_PROCESS_PAIR, COMMAND_HIGH_ENTROPY, and RARE_LD_LIBRARY_PATH_VALUE. The rarity scores represent probabilities of multiple labels occurring at the same time or within a predetermined period of time (co-occurring). The rarity scores are associated with n-grams of the labels (e.g., a combination of two labels, three labels, etc.) and represent probabilities of co-occurring labels. A label n-gram score is calculated based on co-occurring labels of newly observed events and the rarity scores of the label n-grams corresponding to those events. Numerous variations and embodiments of the disclosed techniques will be appreciated in light of this disclosure.

Any number of non-transitory machine-readable mediums (e.g., embedded memory, on-chip memory, read only memory, random access memory, solid state drives, and any other physical storage mediums) are used to encode instructions that, when executed by one or more processors, cause an embodiment of the techniques provided herein to be carried out, thereby allowing for risk-based alerting. Likewise, the techniques can be implemented in hardware (e.g., logic circuits such as field programmable gate array, purpose-built semiconductor, microcontroller with a number of input/output ports and embedded routines).

DETAILED DESCRIPTION

Figure 1:
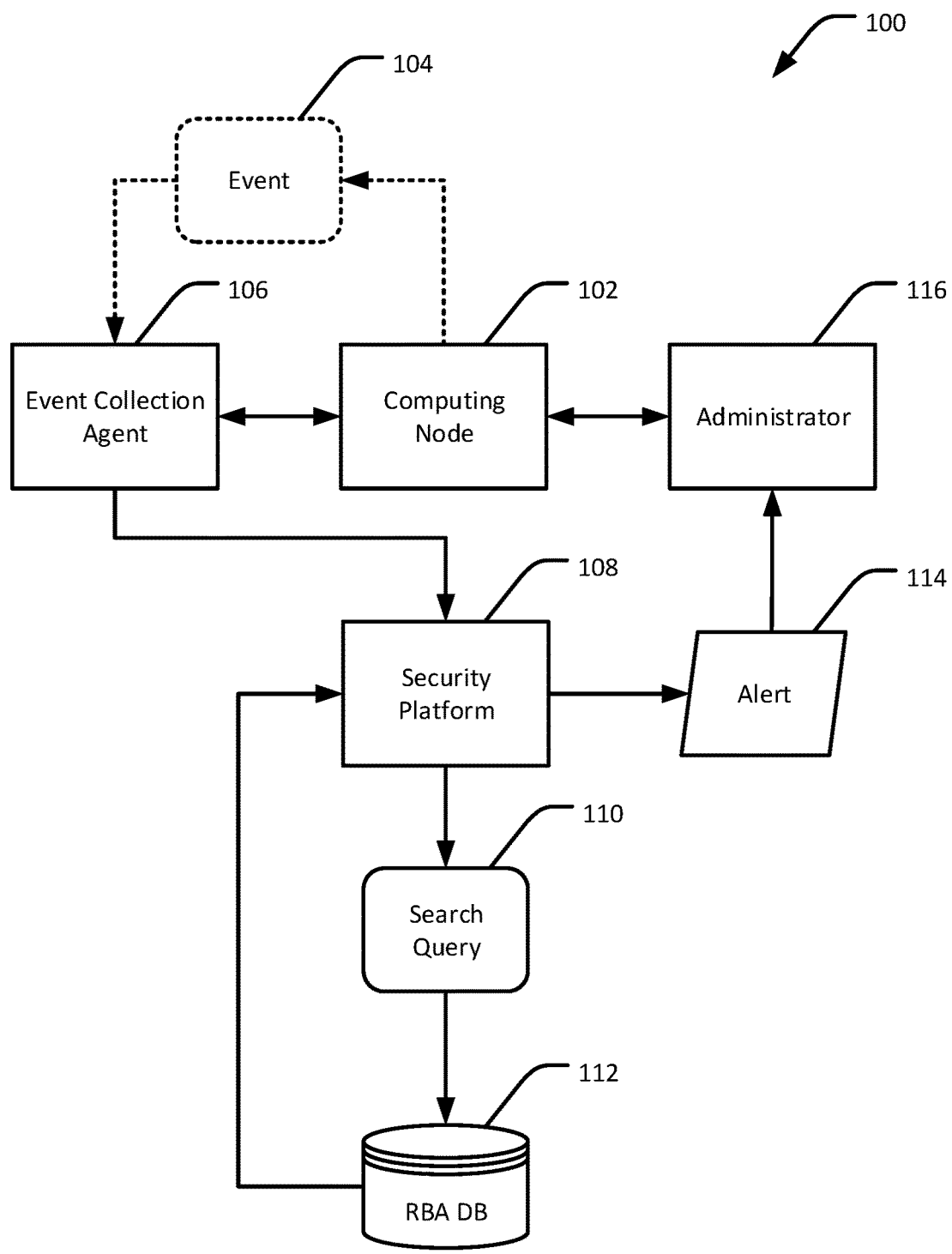
FIG. 1 is a diagram showing a risk-based alerting system and its process flow, in accordance with an embodiment of the present disclosure.

Techniques are disclosed for risk-based alerting. A search query is dynamically generated based on rarity scores associated with raw-level computer event data. In an embodiment, the techniques are implemented in a security platform that includes an event labeling model and a risk scoring model. An example search query includes information about events that occur on a computing node for generating corresponding rarity scores. Raw-level computer event data includes information about commands, program execution, and file access by the computing node. The labeling model is used to assign labels to events, for example, RARE_PROCESS_PATH can be used to label an event associated with a process having a rarely observed execution path (other example labels are described below). The rarity score represents the probability that a combination of attributes of an event, which is represented by a set of labels, will occur with a certain frequency, based on historical data, and is assigned to each event according to a risk-based scoring model. For example, the rarity score is relatively high for suspicious events and relatively low for normal events. The risk-based scoring model is updated as new events are observed.

General Overview

As noted above, SIEM helps correlate data into human-understandable alerts, which can trigger further investigation. However, as explained above, current SIEM approaches rely on static rules and are also susceptible to generating false alerts due to the static nature of the rules. Moreover, these static rules are not always promptly updated by the system administrators to reflect evolving threat conditions. Indeed, it is quite difficult or even impossible for administrators to know all threat conditions, given the vastness and complexity of the event data. Thus, for previously unobserved or otherwise unknown types of malicious activity, existing SIEM solutions cannot detect security threats to the enterprise. More recently, risk-based alerting (RBA) approaches have been developed to evaluate the security risks associated with various combinations or sequences of events. RBA uses a special search query that assigns a score to the activity of a resource based on events and actions generated by that resource. For example, an RBA search can map static indicators from an established framework to highlight specific computing resources that present potential security threats to the enterprise, and alert to activity that exceeds a scoring threshold for the resource. By viewing certain events in context with other events, the score can represent a likelihood that any given event represents malicious activity, and only events that exceed an established threshold are flagged for further investigation. This has the benefit of reducing false positive alerts that result from alerting on individual events or groups of events that represent a relatively low risk of presenting a security threat. However, while RBA is helpful at reducing false positives in relation to SIEM, RBA still suffers from being based on statically written rules. For example, RBA searches use rigid risk scores that are incremented by a constant (fixed) risk factor every time a condition is met. This scoring scheme is complicated because the number of risk factors of potential interest is very large.

In contrast, risk-based alerting techniques are provided herein that dynamically generate a search query based on rarity scores associated with raw-level computer events. To this end, the queries change as the rarity scores change. In more detail, and in accordance with an embodiment of the present disclosure, the event data is pre-processed using historical information about the frequency, or rarity, of instances of individual events either by using information about the frequency, or rarity, of instances of individual events or by describing text-based content of the event using language models and then analyzing the perplexity of the events based on past observations. The outcome represents a search query that reflects the behavior of the environment for the given timeframe. Furthermore, the risk scores can change as the models adapt to newly observed events. This helps achieve a search that is dynamically created in real time, as opposed to a static search that is written by a human and updated on an ad-hoc basis and vastly more limited in scope.

Example Risk-Based Alerting System

FIG. 1 is a diagram showing a risk-based alerting system and its process flow, in accordance with an embodiment of the present disclosure. A computing node 102 generates one or more events 104, which are collected by an event collection agent 106. An event refers to an entry or observation in a dataset. An event can include, for example, information about an action, instance, or occurrence during execution that can be identified by a program and has significance for system hardware or software or data. Events can be user-generated, such as via keystrokes and mouse clicks, or system-generated, such as program loading, memory faults, system errors, or other states of the system. The event collection agent 106 forwards event data relating to the event 104 to a security platform 108. The security platform 108 analyzes the event data and generates a search query 110 for computing one or more rarity scores associated with the events. An RBA database 112 provides information (such as diagnostics) that can be used by the security platform 108 to generate an alert 114. The alert 114 is forwarded to an administrator 116, who can use the information in the alert to conduct further investigation into the event(s) 104, for instance, to determine whether the event is anomalous or normal.

As noted above, existing SIEM techniques for generating alerts use static rules, which are based on the knowledge and experience of the administrators who build the rules. The rules define the queries into a knowledgebase for retrieving information used to alert the administrators to an anomaly associated with activity captured by event logs. The administrators can then further investigate the anomaly to determine whether the activity poses a security risk or threat. Existing RBA techniques take a wider range of events into account than SIEM, and thus can generate higher confidence alerts. However, existing RBA techniques are also based on static queries, which are based on the experience of the administrators. The rules and queries for SIEM and RBA can be updated, but such updates are performed manually and do not reflect the dynamic nature of the environment being monitored by these techniques.

To this end, and in accordance with an embodiment of the present disclosure, a dynamic approach to generating search queries includes: 1) enriching raw event data with descriptive labels, 2) automatically analyzing co-occurrences of the events, 3) assigning rarity scores to various combinations of the labels, and 4) generating a dynamic search query based on the rarity scores.

Elements and Models of the Risk-Based Alerting System

Figure 2:
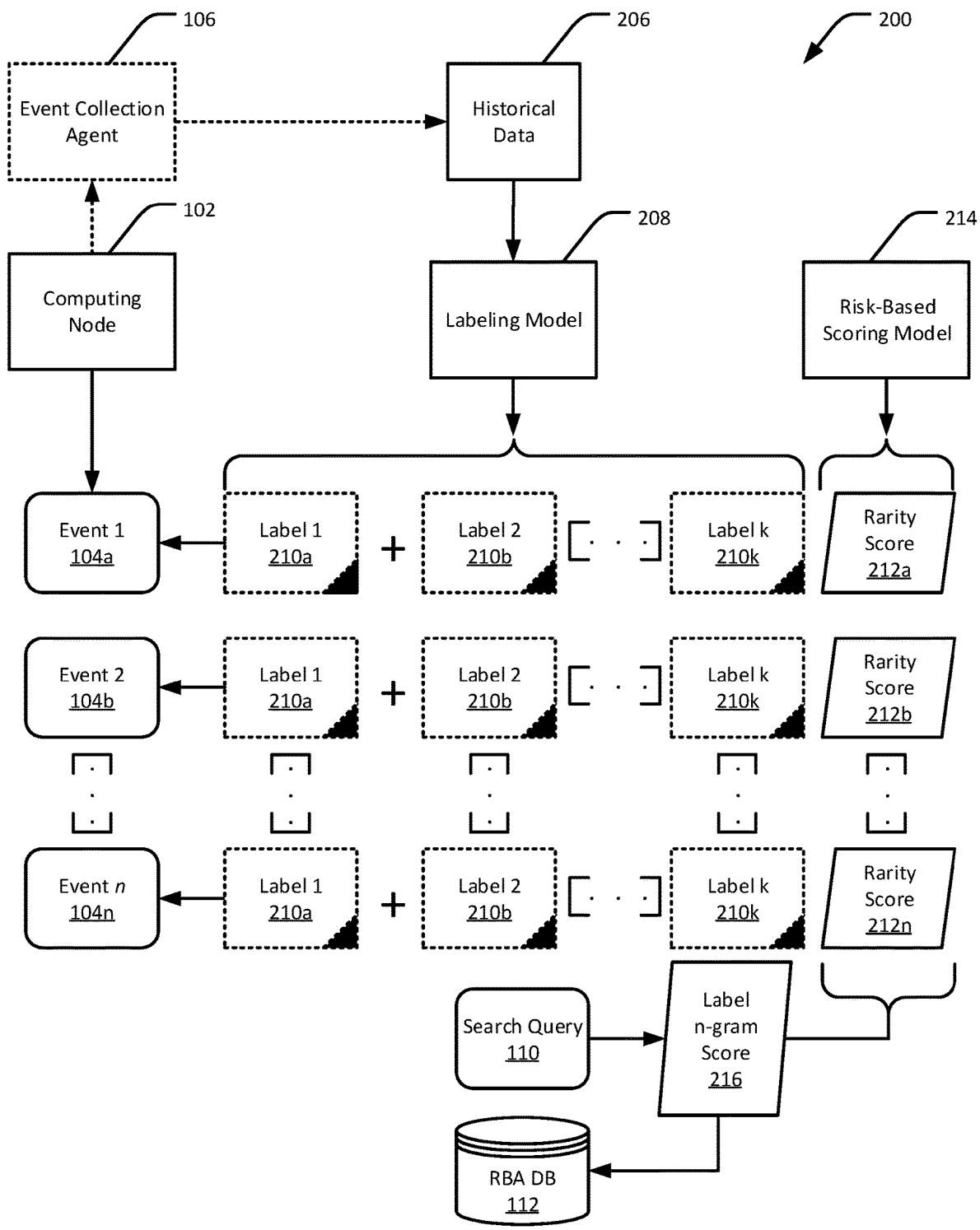
FIG. 2 is a diagram showing example relationships between elements for risk-based alerting techniques that can be carried out by the risk-based alerting system of FIG. 1, in accordance with an embodiment of the present disclosure.

FIG. 2 is a diagram showing example relationships between elements 200 for risk-based alerting techniques that can be carried out by the risk-based alerting system of FIG. 1, in accordance with an embodiment of the present disclosure. The computing node 102 generates one or more computer events 104a . . . 104n, which are stored as historical data 206. A labeling model 208 assigns one or more labels 210a . . . 210k to each of the events 104a . . . 104n. The labels 210a . . . 210n describe one or more attributes of the events 104a . . . 104n, for example, in terms of how frequently the event occurs based on the historical data 206. The attributes can include, for example, a timestamp, a process name, a user, a command-line, and/or any other information that describes the event, including raw text. The labels 210a . . . 210k (or tags) are unique alphanumeric sequences used to describe an event. For example, the label can describe the frequency or rarity of occurrences of the event having a given attribute, and/or the type of event and other information that is pertinent to the event. For example, if an event has an attribute USER, a label RARE_USER can be assigned to the event if the USER attribute for that event is statistically rare for that computing node 102 based on past observations. Note that each event 104a . . . 104n can be associated with any of the labels 210a . . . 210k. For example, a first event E1 can be assigned first and second labels L1 and L2, while a second event E2 can be assigned first and third labels L1 and L3, etc. A set of the labels 210a . . . 210k for a single event 104a . . . 104n is called an n-gram, where n represents the number of labels, such as a trigram USER_ROOT+CMD_NC+PARENT_PROCESS_APACHE, where apache, running under the user root, created a sub-process using the netcat (nc) command.

For each event 104a . . . 104n, a rarity score 212a . . . 212n is assigned to one or more of the corresponding labels 210a . . . 210n according to a risk-based scoring model 214. For example, the rarity score 212 can be assigned to pairs or triplets of the labels 210a . . . 210n (e.g., two labels combined into a pair, three labels combined into a triplet). In this case, the rarity score 212a . . . 212n represents a probability that each of the attributes of the events 104a . . . 104n corresponding to the labels 210a . . . 210k will co-occur (in other words, the rarity score represents the likelihood that two or more given attributes will occur with the same event). Co-occurring attributes and co-occurrence of attributes refer to two or more attributes that occur with the same event. Each time the attributes co-occur is referred to as a co-occurrence instance.

A label n-gram score 216 is generated according to the risk-based scoring model 214 based on the rarity scores 212a . . . 212n associated with the sets of labels 210a . . . 210k and the number of instances of the corresponding events 104a . . . 104n. The n-gram label score 216 is generated by the search query 110, which can be executed periodically (for example, every minute, every hour, every two hours, every 12 hours, daily, etc.).

In further detail, each of the events 104a . . . 104n can include, for example, information about an action, instance, or occurrence that can be identified by a program executing on the computing node 102 and has significance for system hardware or software. The events 104a . . . 104n can be user-generated, such as keystrokes and mouse clicks, or system-generated, such as program loading, memory faults, and system errors. The events 104a . . . 104n can be collected, for example, by the event collection agent 106, which is configured to monitor the activity of the computing node 102, collect various information from the computing node 102, and send it to a centralized log management solution or other database, such as a database of historical data 206. The event collection agent 106 can collect data including, for example, recorded users, command line history, outbound connections, processes being executed, environment variables, and critical files modified. With respect to processes being executed by the computing node 102, the data can be categorized as running processes, running processes listening for network connections, and running processes with ongoing established outbound network connections. The network connections can be further identified by the source port IP address and the destination port IP address.

Each event 104a . . . 104n describing the running process includes identifying information such as the identity of the account from where the data is collected, a unique identifier of the computing resource (e.g., a cloud instance ID), a name of a parent service or process that generated the event (apache, bash, jupyter, etc.), a name of the process used to execute a command (e.g., bash, php, mysql, etc.), a user account name under which the parent process is running and with what privileges, a group name to which the user is allocated, the full command line with parameters or additional services, environment variables describing the system and user, names of files that the process reads or writes), a path defining the logic location on disk or in memory from where the process is being executed, and a time stamp of the moment when the event was generated and/or when the process was executed. It will be understood that other information may be collected from the computing node 102 and used to generate the event 104a . . . 104n. For example, in some instances each user account can generate a unique subset of data dependent on the services it provides. Also, each account can have a different number of associated computing resources and/or a different computing load. As a result, the data generated by each account can differ over time. For example, some accounts are highly active and can generate up to dozens of millions of events over a few hours, while others can generate tens of thousands of events during the same amount of time. To preserve the uniqueness of the activity for each account, each account is processed separately. In some embodiments, the data is aggregated before processing by counting the number of instances of each unique event.

The events 104a . . . 104n are added to the historical data 206, which is fed to the labeling model 208. The labeling model 208 is configured to determine a frequency at which each event 104a . . . 104n occurs, as will be described in further detail below. While some anomalies can be identified statistically, it is difficult to identify outlying data where the data are sparse, which is a trait of text-based data, such as command line events. In such cases, a description is added to the raw event data. In turn, one or more labels (or tags) 210a . . . 210n are generated in accordance with the labeling model 208, based on the descriptions. It will be understood that more than one label can be generated for each event, and that different events can have different labels or sets of labels.

The labels 210a . . . 210n describe attributes of the events 104a . . . 104n in terms of their frequency of occurrence. For example, the labels 210a . . . 210n can include information such as RARE_USER, RARE_COMMAND, RARE_PARENT_PROCESS, RARE_PATH, RARE_PROCESS_PATH, RARE_OUTBOUND_CONNECTION, FIRST_TIME_SEEN_ANOMALY, etc., to describe the events as occurring with the corresponding attributes rarely over a given period of time, as recorded in the historical data 206. The labels 210a . . . 210n help to highlight outlying events and some particular behaviors of potentially compromised applications. This is in contrast to existing techniques which categorize the events by type rather than frequency of occurrence.

In some embodiments, the labels 210a . . . 210n can represent co-occurrence patterns of multiple attributes that describe the events 104a . . . 104n. In this manner, the labeling model 208 can identify malicious activity that is not clearly indicated by a single event attribute but may be a potential candidate for further analysis when viewed in combination with one or more co-occurring attributes.

The labels 210a . . . 210n are not used as direct indicators of a security risk. Instead, the rarity score 212 is used to highlight suspect activity by jointly analyzing the labels 210a . . . 210n. The rarity score 212 is assigned to combinations of the labels 210a . . . 210k based on a total number of observed instances of the events 104a . . . 104n having the same set of labels, such as the co-occurrence of Attribute 1 and Attribute 2, represented by Label 1 and Label 2, respectively. For example, the rarity score 212 can be assigned to a combination of the first label 210a and the second label 210b based on a total number of observed instances of the first event 104a with the same set of attributes represented by the first label 210a and the second label 210b. The rarity score 212a . . . 212n can be generated as a linear function between the combinations of the labels 210a . . . 210k and a scalar output using the risk-based scoring model 214. For example, the rarity score 212a . . . 212n is relatively high for suspicious activity and relatively low for normal activity.

In some embodiments, the risk-based scoring model 214 is updated using an unsupervised learning technique. Unsupervised learning is useful when the training data is not labeled, biased, or unavailable. As noted above, the labels 210a . . . 210k are unique per event 104a . . . 104n, and the rarity score 212 can be assigned to a combination of two or more labels. For example, the labels 210a . . . 210k are arranged into unique combinations that represent bigrams (two labels) and trigrams (three labels), although it will be understood that any n-gram of labels can be used (e.g., n=2, 3, 4, . . . ). An n-gram refers to a combination of n labels. A unigram refers to a single label. A bigram refers to a combination of two labels, such as (Label 1+Label 2). A trigram refers to a combination of three labels, such as (Label 3+Label 4+Label 5). Examples of such n-grams are shown in Table 1.

TABLE 1

| n-grams for a Set of Labels | |
| --- | --- |
| Set of Labels | (CMD_CP, RARE_PARENT, USER_CMD) |
| Unigrams | (CMD_CP), (RARE_PARENT), (USER_CMD) |
| Bigrams | (CMD_CP, RARE_PARENT), (CMD_CP, USER_CMD), (RARE_PARENT, USER_CMD) |
| Trigrams | (CMD_CP, RARE_PARENT, USER_CMD) |

The occurrence frequency of a given n-gram, which represents the co-occurrence of the labels in the n-gram, indicates how often the labels 210a . . . 210k, and thus the corresponding events, are expected to appear together. Frequently occurring n-grams are correlated with normal operations, while rarely occurring n-grams represent potentially anomalous events. An example of the risk-based scoring model 214 is defined as follows.

First, the n-gram occurrence frequency probabilities are computed using, for example, maximum likelihood estimates. Next, the rarity score 212a . . . 212n is assigned to each n-gram. The rarity score 212a . . . 212n can be calculated, for example, as the negative log likelihood of the respective n-gram appearing. For instance, if $G_k$ is the set of all n-gram combinations for even $E_k$ and $P_t$ is the probability of observing a given label t, then the rarity score 212 (S) for $E_k$ is defined as:

$$S_{E_k} = -\sum_{t \in G_k} \log P_t$$

Next, the rarity score 212a . . . 212n is used to generate the label n-gram score 216 for each instance of newly observed events 104a . . . 104n. For example, consider a bigram (LABEL_1, LABEL_2) representing an instance of Event 1. If the rarity score assigned to the bigram is R, then the label n-gram score is R multiplied by the number of instances of Event 1 within a given window of time (e.g., seconds, minutes, hours, etc.). The label n-gram score 216 is generated by the search query 110.

Anomaly Detection Process Flow

Figure 3:
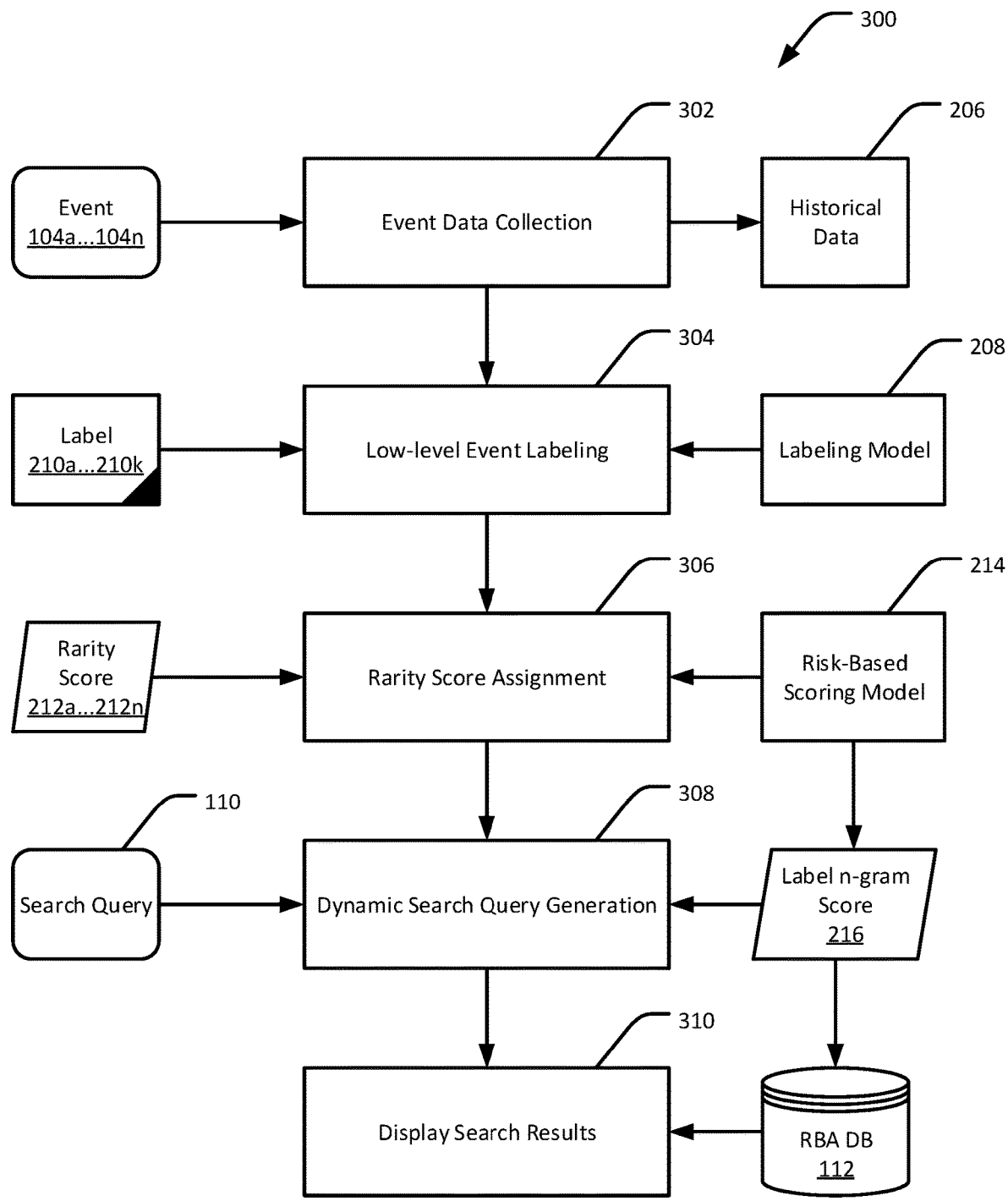
FIG. 3 is a flow diagram of an example anomaly detection process that can be carried out by the risk-based alerting system of FIG. 1, in accordance with an embodiment of the present disclosure.

FIG. 3 is a flow diagram of an example anomaly detection process 300 that can be carried out by the risk-based alerting system of FIG. 1, in accordance with an embodiment of the present disclosure. The process 300 includes event data collection 302, low-level event labeling 304, rarity score assignment 306, dynamic search query generation 308, and search result display 310.

Collecting Event Data

Event data collection 302 includes capturing and collecting the events 104a . . . 104n from the computing node 102. For example, security-related events can include events generated by running processes and command-line activity can be captured. However, it will be understood that any type of event can be captured for further analysis. As noted above, in some cases the event collection agent 106 is configured to monitor the computing node 102 for the events 104a . . . 104n and add them to the historical data 206. The events 104a . . . 104n can occur at any time. Thus, in some embodiments, the events 104a . . . 104n are timestamped or counted within a given time window. Events 104a . . . 104n that occur infrequently will be treated differently than events 104a . . . 104n that occur with relatively high frequency, and thus the timestamp or count can be used to determine the frequency at which any given event occurs. The frequency at which the events 104a . . . 104n occur is used to distinguish rarely occurring events from commonly occurring ones regardless of how the event is categorized (e.g., by type or kind).

Labeling Events

For low-level event labeling 304, one or more labels 210a . . . 210k are assigned to each event 104a . . . 104n according to the labeling model 208, which classifies events according to the frequency of occurrence. An initial labeling model 208 can be build using a large dataset of prior event observations. Then, running snapshots of the events 104a . . . 104n are labeled according to the labeling model 208. The initial labeling model 208 is updated with new event observations for reacting to changes in the infrastructure and/or operation of the computing nodes. While the running snapshots can be taken over relatively small windows of time (for example, one hour, two hours, etc.), the initial labeling model 208 is built using longer term historical data 206 (for example, events observed over one week, two weeks, three weeks, one month, two months, etc.). A longer time range of the historical data 206 used to build the initial model is used to avoid data sparsity and to scale for rare but benign operational events. An example of such a benign event can be a user connecting to a server to trigger a database restore process in the normal course of data recovery, in what would otherwise be a normal production environment driven only by automated events or scripts.

In some embodiments, the labeling model 208 can include absolute counts of occurrences of discrete events 104a . . . 104n. In some other embodiments, the labeling model 208 can include machine learning (ML) architectures that are configured to evaluate and score portions of the data. In any event, the labeling model 208 is configured to generate the labels 210a . . . 210k for each event 104a . . . 104n. Each of the labels 210a . . . 210k can include, for example, text fields, numerical fields, categorical fields, and/or structured data fields for providing information about the corresponding event 104a . . . 104n.

For example, for text fields of the labels 210a . . . 210k, such as for labeling events 104a . . . 104n relating to verbose logs, command lines, or other similar data, language modeling using natural language processing is used to compute the perplexity (predictability) of new event observations. The mean (μ) and standard deviation (σ) of scores for past event observations are then computed. In some cases, one of several different labels can be assigned to the event to represent the perplexity (P) of new event (e.g., "LOW,"

"MEDIUM," "HIGH," or "EXTREME"). For example, a label "MEDIUM" can be assigned to the event if $P \in [\mu+\sigma, \mu+2v]$, "HIGH" if $P \in (\mu+2\sigma, \mu+4\sigma]$, and "EXTREME" if $P > \mu+4\sigma$. It will be understood from these examples that other combinations of intervals can be used to determine which label to assign to the event. In another example, normalization and/or statistics can be used to generate the labels numeric fields of the labels (e.g., "PROCESS_APPEARS_LESS_THAN_5_TIMES") in a similar manner to generating the text fields.

For fields with categorical values, the probability of seeing a value based on past observations is computed. The labels thus highlight any event with a probability below a certain threshold (e.g., "PROCESS_OCCURRENCE_LESS_THAN_1%"). For fields with structured data, the event data is decomposed into first-level fields using one of the labeling strategies described above that applies to that specific datatype. In some cases, the probability of observing a field is measured and missing values are assigned to the label, if, based on past observations, there is a high chance of observing the field. For example, if the probability of seeing a given field in past observations is greater than 98%, or if there are environment variables that contain a name/attribute and a key pair value.

In some examples, certain events are combined into pairs or triplets, where all of the events are unlikely to occur at the same time or at approximately the same time. In some examples, event data from high-entropy values (categorial or numerical) is filtered. For example, if the event data includes the user that launched a process, the event can be distinguished between standard system users (such as root, apache, ldap, etc.) and other users. Lists of known system users can be used to label anything that is not considered a local user. This will quickly highlight events caused by users, such as "apache," running an atypical command-line (e.g., "cat," "tail," "useradd," etc.) for that user.

Assigning Rarity Scores to Combinations of Labels

For rarity score assignment 306, the rarity score $212a \ldots 212n$ is assigned to each combination of the labels $210a \ldots 210k$ according to the risk-based scoring model 214. When each label $210a \ldots 210k$ is analyzed as a stand-alone occurrence, the label is not informative enough to draw conclusions on the rarity of the individual event. Therefore, the labels $210a \ldots 210k$ are analyzed in context with each other considering at least several, or all, possible combinations of labels. Several statistical methods can be employed, including n-gram-based analysis of the labels $210a \ldots 210k$, to enable incremental updates to the risk-based scoring model 214. The rarity score $212a \ldots 212n$ is computed based on the joint probability of seeing the combinations of labels.

To build the initial risk-based scoring model 214, after the events have been labeled, each instance in the dataset is assigned to a combination of bigrams and trigrams of the labels $210a \ldots 210k$, such as shown in Table 1. This is the result of a Cartesian product between all labels $210a \ldots 210k$, in which ordering is accounted for to eliminate duplicate n-grams. For example, if for one instance bigram (<LABEL_1><LABEL_2>) is generated, bigram (<LABEL_2><LABEL_1>) is not generated.

Figure 4:
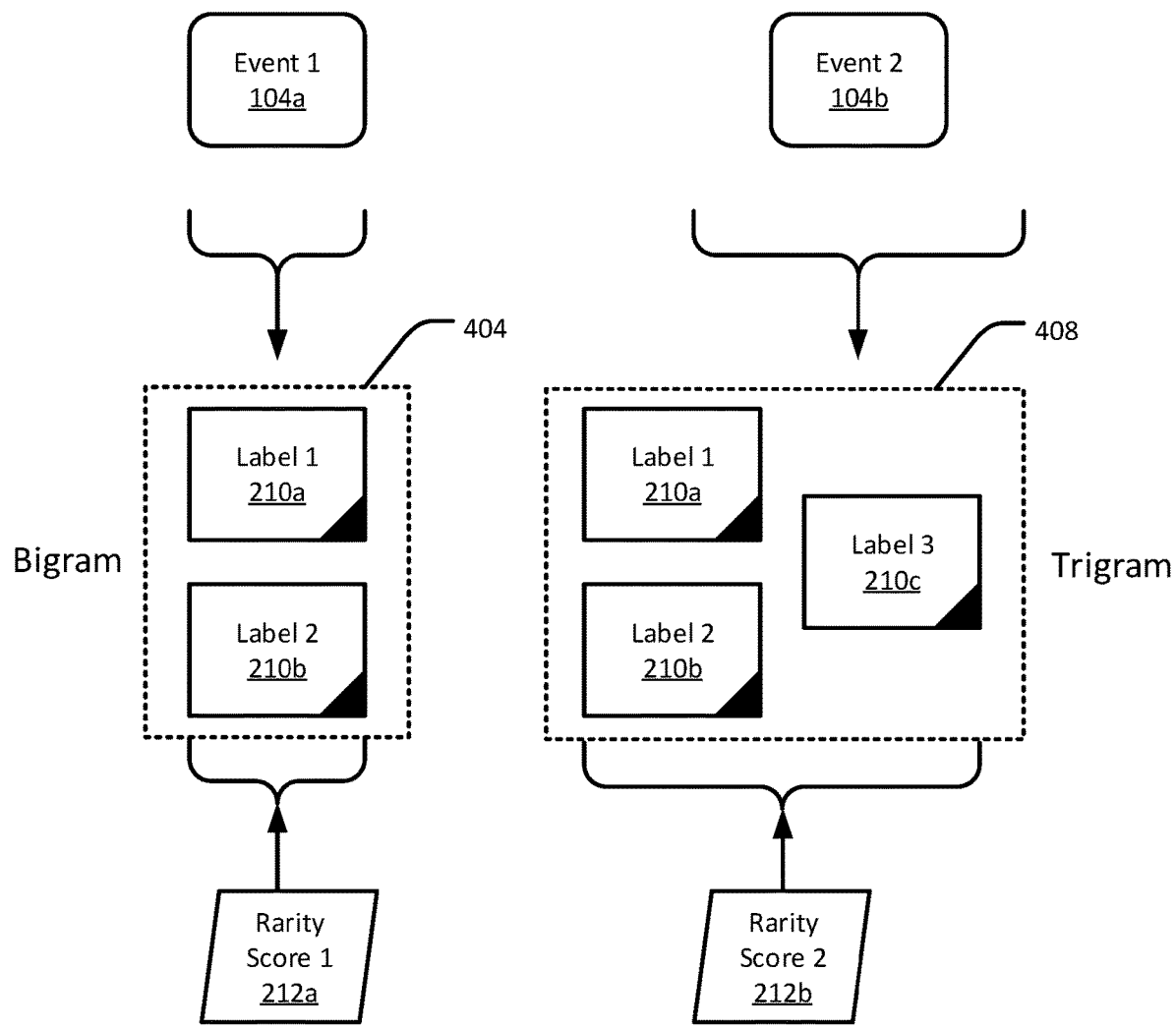
FIG. 4 shows an example representation of label n-grams determined according to the labeling model of the risk-based alerting system of FIG. 1, in accordance with an embodiment of the present disclosure.

FIG. 4 shows an example representation of label n-grams determined according to the labeling model of the risk-based alerting system of FIG. 1, in accordance with an embodiment of the present disclosure. An instance of Event 1 having a bigram 404 including Label 1 and Label 2 is assigned Rarity Score 1, which represents the frequency at which Event 1 has been observed. Similarly, an instance of Event 2 having a trigram 408 including Label 1, Label 2, and Label 3 is assigned Rarity Score 2, which represents the frequency at which Event 2 has been observed. The number of instances of each bigram or trigram (or other n-gram) inside the training dataset is counted. For example, if Event 1 occurs twice within a first period of time, the bigram 404 is counted twice, one for each instance within the data collection window. If Event 2 occurs five times within a second period of time, the trigram is counted five times, once for each instance within the data collection window. Using these counts, the probability P of observing each possible bigram or trigram is calculated and assigned a score of $-\log(P)$. This score is referred to as the rarity score $212a$, $212b$, etc.

Dynamically Scoring Newly Observed Events

Referring again to FIG. 3, for dynamic search query generation 308, the label n-gram score 216 is computed using the rarity score $212a \ldots 212n$ for each instance inside the newly observed data (e.g., the data inside the pre-determined analysis window or period of time). The rarity scores $212a \ldots 212n$ for all raw events are used to compute the label n-gram score 216 based on all possible combinations of n-grams of labels. For example, the anomaly score 216 is the sum of the rarity score $212a$ for each n-gram instance over a pre-determined period of time (e.g., in a newly observed dataset), using the risk-based scoring model 214 as a lookup for the rarity score $212a$, such as described with respect to FIG. 2. If, for example, four co-occurrence instances of a bigram are observed (that is, the event $104a$ occurs four times within the data collection window), then the label n-gram score 216 (S) will be the rarity score 212 (R) for the bigram multiplied by four ($S=R\times4$). For previously unobserved bigrams (which have not been assigned a rarity score), the label n-gram score 216 is initialized to $$-\log\left(\frac{1}{\text{total } bigrams + 1}\right)$$

and for previously unobserved trigrams (which have not been assigned a rarity score), the label n-gram score 216 is initialized to $$-\log\left(\frac{1}{\text{total } trigrams + 1}\right).$$

For example, the label n-gram score 216 is as follows:

$$S_{E_i} = \sum_{N \in E_i} \begin{cases} \text{score}(N), & \text{if } N \text{ was previously observed} \\ \text{score}(\langle UNK \rangle), & \text{if } N \text{ is an unknown label combination} \end{cases}$$

where,
$E_i$—Is the raw entry i
$S_{E_i}$—Is the score of entry i
N—Is an n-gram
score(N)—Is the pre-computed rarity score for the given N-gram (N)
score(<UNK>)—Is the pre-computed rarity score for unknown events The labeling model 208 and the risk-based scoring model 214 can be updated to adapt to infrastructure changes, such as the addition of computing nodes or other operational changes. In some examples, the labeling model 208 is updated as fast as new data arrives. For instance, newly observed data is labeled and scored every two hours, the labeling model 208 can be updated at the same frequency. However, scheduled updates are also possible (e.g., daily, weekly, monthly, etc.).

For dynamic search query generation 308, the search query 110 is generated based on a series of prior events or observations, as opposed to an individual event or observation. An advantage of dynamically generating the search query 110 (instead of using static queries) is that, in light of any infrastructure changes, dynamic scores more accurately reflect the present reality of which events are considered normal or abnormal in the infrastructure. The dynamic search query thus reflects incremental changes such that events that could previously be considered anomalies may later be considered normal activity if the expected behavior is consistent over a longer period of time.

In some embodiments, the search query 110 is generated through the use of cascaded score evaluation commands, which compute a running sum over all n-grams of the labels 210$a$ . . . 210$k$. For example, for a given training dataset $D_t$ and an evaluation dataset $D_e$, the dataset may include three labels $T_1$, $T_2$, and $T_3$. In $D_t$ the rarity scores $S_{12}$ and $S_{13}$ are computed for bigram combinations $T_1T_2$ and $T_1T_3$ as follows:

```
event - structure to hold all event data
event.tags - list field with all assigned tags/labels
event.score - final rarity score of the event
events - the collection of all the events in D_e
1      foreach event in event{ //this is a placeholder for the search conditions
2          let event.score = 0
3          if T_1 and T_2 in event.tags let event.score=event.score + S_12
4          if T_1 and T_3 in event.tags let event.score=event.score + S_13
5      }
```

If, in the above example, the events in $D_e$ contain the bigram $T_2T_3$, then the code will not assign any score to this bigram, which is equivalent to assigning a rarity score of 0. In such cases, the score of previously unseen bigrams is give a score of $$-\log\left(\frac{1}{\text{total bigrams} + 1}\right).$$

To correctly score previously unseen bigrams, the following example pseudocode can be used:

```
event - structure to hold all event data
event.tags - list field with all assigned tags/labels
event.score - final rarity score of the event
events - the collection of all the events in D_e
1         let unseen_score = -log(1/ (total bigrams+1))
2         foreach event in event{ //this is a placeholder for the search conditions
3         let n = len(event.tags)
4         let event.score = (fact(n)/(fact(2) * fact(n−2))) * unseen_score
5         if T_1 and T_2 in event.tags let event.score=event.score + S_12 - unseen_score
6         if T_1 and T_3 in event.tags let event.score=event.score + S_13 - unseen    score
7         }
```

In this example, instead of initializing an event's score to 0, assume that all possible n-grams from that event are previously unseen. If n is the number of labels for a given event, the total number of bigrams is equal to combinations of n taken 2, computed as $$\frac{n!}{2!(n-2)!}$$

(lines 3 and 4).

Similarly, the total number of trigrams is equal to combinations of n taken 3. The scores of the seen n-grams is subtracted by the number of unseen events (lines 5 and 6).

For example, if an event includes all three labels ($T_1$, $T_2$ and $T_3$), the rarity score is initialized with combinations of 3 taken 2 (which is 3) multiplied by the score of an unseen event (lines 3 and 4). After this, the scores for $T_1T_2$ and $T_1T_3$ are added together, then subtracting twice the score for an unseen event (lines 5 and 6). The rarity score remains $S_{12}+S_{13}+$unobserved_risk_score.

An example search query is as follows:

```
index=<index_name> sourcetype= <rba_name>
| eval risk_mod_count=0
| eval risk_mod_count=if(tags=="FIRST_TIME_SEEN_ANOMALY" and
tags=="RARE_USER_PROCESS_PAIR" and
tags=="USER_IS_ROOT",risk_mod_count+2.3431312658906585,risk_mod_count)
| eval risk_mod_count=if(tags=="RARE_PARENT" and
tags=="RARE_USER_PROCESS_PAIR" and
tags=="USER_IS_ROOT",risk_mod_count+3.8031387010482454,risk_mod_count)
| eval risk_mod_count=if(tags=="FIRST_TIME_SEEN_ANOMALY" and
tags=="RARE_PARENT" and
tags=="RARE_USER_PROCESS_PAIR",risk_mod_count+3.9906750665821913,risk_mod_cou
nt)
| eval risk_mod_count=if(tags=="FIRST_TIME_SEEN_ANOMALY" and
tags=="RARE_PARENT" and
tags=="USER_IS_ROOT",risk_mod_count+3.9906750665821913, risk_mod_count)
| eval risk_mod_count=if(tags=="CMD_EXTREME_ENTROPY" and
tags=="RARE_USER_PROCESS_PAIR" and
tags=="USER_IS_ROOT",risk_mod_count+4.023131091853032,risk_mod_count)
| eval risk_mod_count=if(tags=="CMD_EXTREME_ENTROPY" and
tags=="FIRST_TIME_SEEN_ANOMALY" and
tags=="RARE_USER_PROCESS_PAIR",risk_mod_count+4.079561460462181,risk_mod_coun
t)
| eval risk_mod_count=if(tags=="CMD_EXTREME_ENTROPY" and
tags=="FIRST_TIME_SEEN_ANOMALY" and
tags=="USER_IS_ROOT",risk_mod_count+4.079561460462181,risk_mod_count)
| eval risk_mod_count=if(tags=="CMD_EXTREME_ENTROPY" and tags=="CMD_STRINGS"
and
tags=="RARE_USER_PROCESS_PAIR",risk_mod_count+4.247306064485541,risk_mod_coun
t)
| eval risk_mod_count=if(tags=="CMD_EXTREME_ENTROPY" and tags=="CMD_STRINGS"
and tags=="USER_IS_ROOT",risk_mod_count+4.247306064485541,risk_mod_count)
| eval risk_mod_count=if(tags=="CMD_STRINGS" and
tags=="RARE_USER_PROCESS_PAIR" and
tags=="USER_IS_ROOT",risk_mod_count+4.247306064485541,risk_mod_count)
.....
Extra 4800 eval (if statements lines)
.....
| eval risk_mod_count=if(tags=="CMD_CUT" and tags=="FIRST_TIME_SEEN_ANOMALY"
and
tags=="RARE_PROCESS_PATH",risk_mod_count+15.477749247961986,risk_mod_count)
| eval risk_mod_count=if(tags=="CMD_CUT" and tags=="RARE_PROCESS_PATH" and
tags=="RARE_USER_PROCESS_PAIR",risk_mod_count+15.477749247961986,risk_mod_cou
nt)
| eval risk_mod_count=if(tags=="CMD_CUT" and tags=="RARE_PROCESS_PATH" and
tags=="USER_IS_ROOT",risk_mod_count+15.477749247961986,risk_mod_count)
| eval risk_mod_count=if(tags=="CMD_FIND" and tags=="CMD_MEDIUM_ENTROPY" and
tags=="PROCESS_APPEARS_LESS_THAN_5_TIMES",risk_mod_count+15.477749247961986,r
isk_mod_count)
| eval risk_mod_count=if(tags=="CMD_HIGH_ENTROPY" and tags=="CMD_SFTP" and
tags=="RARE_PARENT",risk_mod_count+15.477749247961986,risk_mod_count)
| eval risk_mod_count=if(tags=="CMD_EXTREME_ENTROPY" and tags=="CMD_SUDO" and
tags=="PROCESS_APPEARS_LESS_THAN_5_TIMES",risk_mod_count+15.477749247961986,r
isk_mod_count)
| eval risk_mod_count=if(tags=="CMD_SUDO" and
tags=="PROCESS_APPEARS_LESS_THAN_5_TIMES" and
tags=="RARE_USER_PROCESS_PAIR",risk_mod_count+15.477749247961986,risk_mod_cou
nt)
| eval risk_mod_count=if(tags=="CMD_SUDO" and
tags=="PROCESS_APPEARS_LESS_THAN_5_TIMES" and
tags=="USER_IS_ROOT",risk_mod_count+15.477749247961986,risk_mod_count)
| stats sum(risk_mod_count) as total risk_mod_count, avg(risk_mod_count) as
avg_score count as total_anomalies, , dc(tags) as tags count
```

The search query 110 returns the original raw events/data, the labels 210a . . . 210k, and the label n-gram score 216 for the corresponding event 104a . . . 104n. Additionally, post-aggregation of data (for instance, computing and machine or user oriented summed score) help the administrator 116 better understand what is happening inside the infrastructure and decide if any action is needed. Such data post-aggregation can be achieved, for example, by issuing standard SIEM aggregation commands (such as Splunk 'STATS SUM . . . BY . . . ').

Dynamic RBA Example

RBA can be implemented in multiple ways, such as by summing the rarity scores of the activity of a specific resource. In this manner, RBA can consider multiple types or sources of events. For example, a tool highly frequently used by attackers is Netcat (command: "nc"). This utility is used to test open services, transfer files or create shells (or reverse shells). An RBA example for this tool can be as follows:

```
Init risk=0
If command_line contains "nc": risk=risk+1
```

The rarity score for all computing resources that execute "nc" will increment for each execution. However, in some cases Netcat is also highly used by system administrators to test and check all kinds of services. In these cases, incrementing the risk for each netcat command identified might generate false positives RBA alerts. However, if the probability of occurrence for netcat commands for given a dataset is computed, the appropriate rarity score for netcat can be defined. For example, if netcat is actually a rare command, the rarity score can be increased by a large value (e.g., risk=risk+100). By contrast, if netcat is frequently used by administrators, the rarity score can be small (e.g., risk=risk+0.001).

In another example, outbound connections can occur towards a resource that is inside the monitored infrastructure (e.g., PRIVATE_IP) or towards an external resource (PUBLIC_IP). As in the case of the netcat utility described above, some administrators can use netcat to test the connectivity to internal resources. The observation can be described by the following two labels:

Observation X—LABELS: CMD_NC & PRIVATE_IP

In the case of a netcat invocation that connects to an external resource, the observation can be described by the following two labels:

Observation Y—LABELS: CMD_NC & PUBLIC_IP

If this pair of labels is rare, the rarity score will be high. Thus, by combining labels which are independently frequent but rarely co-occur, the label combination represents a rare anomaly, which may warrant further investigation.

In general production environment, the commands executed by user should be limited to initial setup and rare maintenance or quickly debugging and fixing issues. Commands executed by user in cloud instances are likely to be a rare occurrence and thus will lead to a high rarity score. For example, consider the following observations:

Observations X:—Labels: CMD_W & USER_CMD & FIRST_TIME_SEEN_ANOMALY
Observations Y:—Labels: CMD_CHKCONFIG & USER_CMD & FIRST_TIME_SEEN_ANOMALY
Observations Z:—Labels: CMD_CP In this example, the first two observations will generate high rarity score, and more such commands executed in a particular period of time will lead to the co-occurrence instance being flagged as an anomalous event. This is because such observations are considered abnormal in a production environment where user interference (via command execution) is expected to be minimal.

Example Computing Environment

Figure 5:
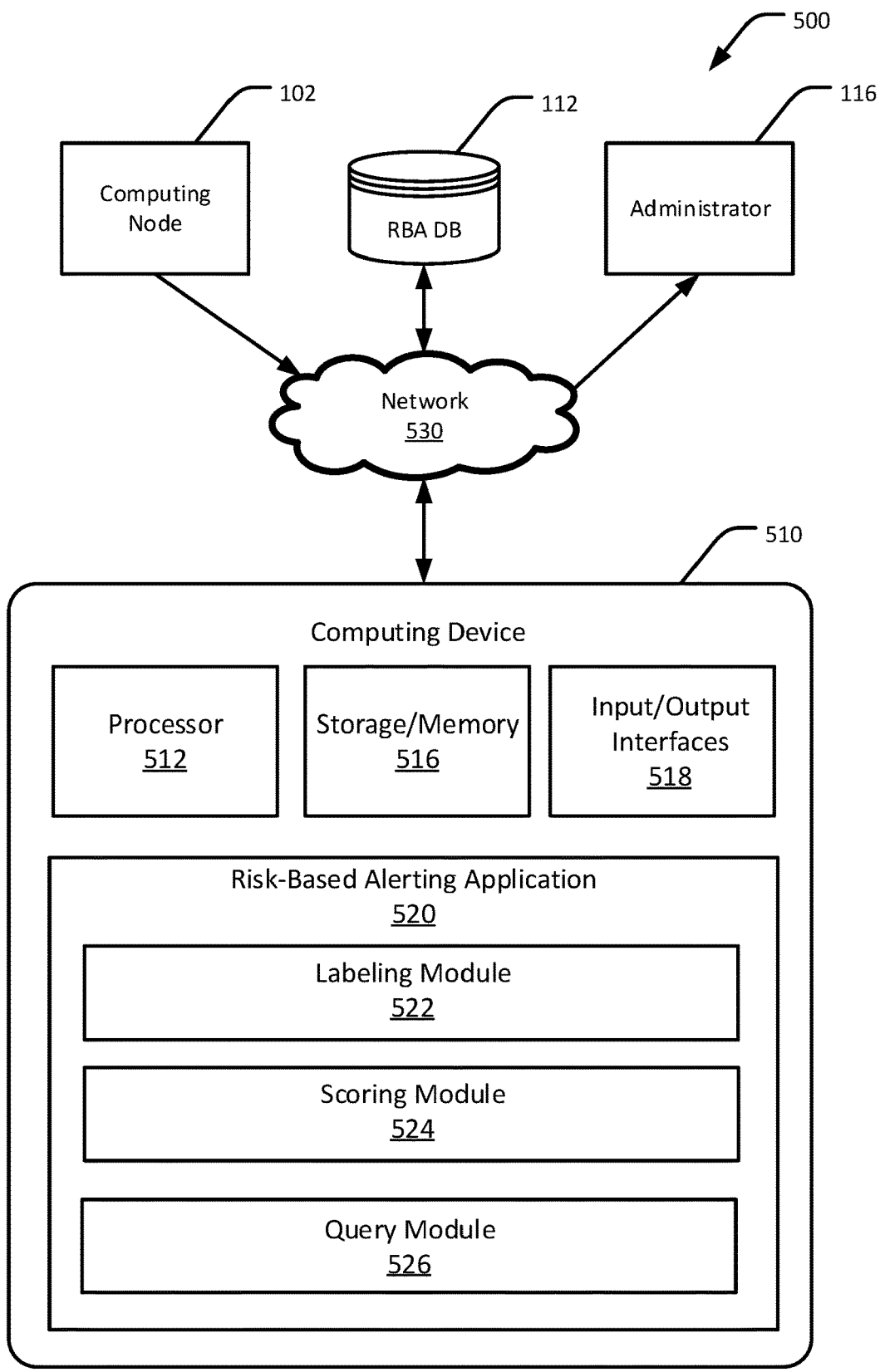
FIG. 5 illustrates an example computing environment including a risk-based alerting system, in accordance with an embodiment of the present disclosure.

FIG. 5 illustrates an example computing environment 500 including a risk-based alerting system, in accordance with an embodiment of the present disclosure. The environment 500 includes a computing device 510 having at least one processor 512, one or more storage or memory devices 516, and one or more input/output interfaces 518, including, for example, a network interface (I/F) and a graphical user interface (GUI). The GUI includes or is configured to interact with a display or other user output device, and a user input device. The processor 512 of the computing device 510 is configured to execute a risk-based alerting application 520, which includes a labeling module 522, a scoring module 524, and a query module 526, which are described in further detail below. Each of the modules 522, 524, and 526 execute in conjunction with each other to perform a process for risk-based alerting, as described herein.

The computing device 510 is a computer system, such as a workstation, desktop computer, server, laptop, handheld computer, tablet computer, or other form of computing or telecommunications device that is capable of communication with one or more other computing devices (for example, via a network 530), and that has sufficient processor power and memory capacity to perform the operations described in this disclosure. In some embodiments, a distributed computational system is provided including a plurality of such computing devices.

In some embodiments, the storage/memory 516 can include one or more non-transitory computer-readable mediums having encoded thereon one or more computer-executable instructions or software for implementing techniques as variously described in this disclosure. For example, the storage/memory 516 can include a non-transitory computer-readable medium having one or more types of hardware memory, non-transitory tangible media (for example, one or more magnetic storage disks, one or more optical disks, one or more USB flash drives), and the like. The storage/memory 516 is provided on the computing device 510 or provided separately or remotely from the computing device 510. In some embodiments, the storage/memory 516 includes a computer system memory or random access memory, such as a durable disk storage (which includes any suitable optical or magnetic durable storage device, e.g., RAM, ROM, Flash, USB drive, or other semiconductor-based storage medium), a hard drive, CD-ROM, or other computer readable mediums, for storing data and computer-readable instructions or software that implement various embodiments as taught in this disclosure. In some embodiments, the storage/memory 516 includes other types of memory as well, or combinations thereof.

The processor 512 is configured to execute computer-readable and computer-executable instructions or software stored in the storage/memory 516, including any non-transitory computer-readable medium, and other programs for controlling system hardware. In some examples, the processor 512 includes multiple cores to facilitate parallel processing or may be multiple single core processors. Any number of processor architectures can be utilized, such as a central processing unit and co-processor, a graphics processor, and a digital signal processor. In some embodiments, virtualization is employed in the computing device 510 so that infrastructure and resources in the computing device 510 are shared dynamically. For example, a virtual machine is provided to handle a process running on multiple processors so that the process appears to be using only one computing resource rather than multiple computing resources. Potentially, multiple virtual machines are also used with one processor.

The input/output interfaces 518 can include a network chip or chipset which allows for wired or wireless connection between the computing device 510 and a communication network 530 and other computing devices and resources, such as the computing node 102, the RBA database 112, and the administrator 116. A user interacts with the computing device 510 through the input/output interfaces 518, which can include, for example, a display, screen, or monitor for displaying one or more user interfaces or other information, including at least some outputs of the risk-based alerting application 520. The user further interacts with the computing device 510 through input/output interfaces 518 to receive input from the user via, for example, a keyboard, a joystick, a game controller, a pointing device (e.g., a mouse, a user's finger interfacing directly with a touch-sensitive display device, etc.), or any suitable user interface, including an augmented reality (AR) headset. The computing device 510 may include or be connected to any other suitable conventional input/output (I/O) peripherals. In some embodiments, the computing device 510 includes or is operatively coupled to various suitable devices via the input/output interfaces 518 for performing one or more of the aspects as variously described in this disclosure.

The computing device 510 runs any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 510 and performing the operations described in this disclosure. In an embodiment, the risk-based alerting application 520 is executed at least in part on one or more cloud machine instances.

In other embodiments, the functional components/modules are implemented with hardware, such as gate level logic (e.g., FPGA) or a purpose-built semiconductor (e.g., ASIC). Still other embodiments are implemented with a microcontroller having several input/output ports for receiving and outputting data, and several embedded routines for carrying out the functionality described in this disclosure. In a more general sense, any suitable combination of hardware, software, and firmware are used, as will be apparent.

As will be appreciated in light of this disclosure, the various modules and components of the system, such as the risk-based alerting application 520, the labeling module 522, the scoring module 524, the query module 516, or any combination of these, may be implemented in software, such as a set of instructions (e.g., HTML, XML, C, C++, object-oriented C, JavaScript®, Java®, BASIC, etc.) encoded on any machine-readable medium or computer program product (e.g., hard drive, server, disc, or other suitable non-transitory memory or set of memories), that when executed by one or more processors, such as the processor 512, cause the various methodologies provided in this disclosure to be carried out. It will be appreciated that, in some embodiments, various functions and data transformations performed by the user computing system, as described in this disclosure, are performed by one or more suitable processors in any number of configurations and arrangements, and that the depicted embodiments are not intended to be limiting. Various components of this example embodiment, including the computing device 510, are integrated into, for example, one or more desktop or laptop computers, workstations, tablets, or other such computing devices. Other componentry and modules typical of a computing system will be apparent.

Example Methodologies

Figure 6:
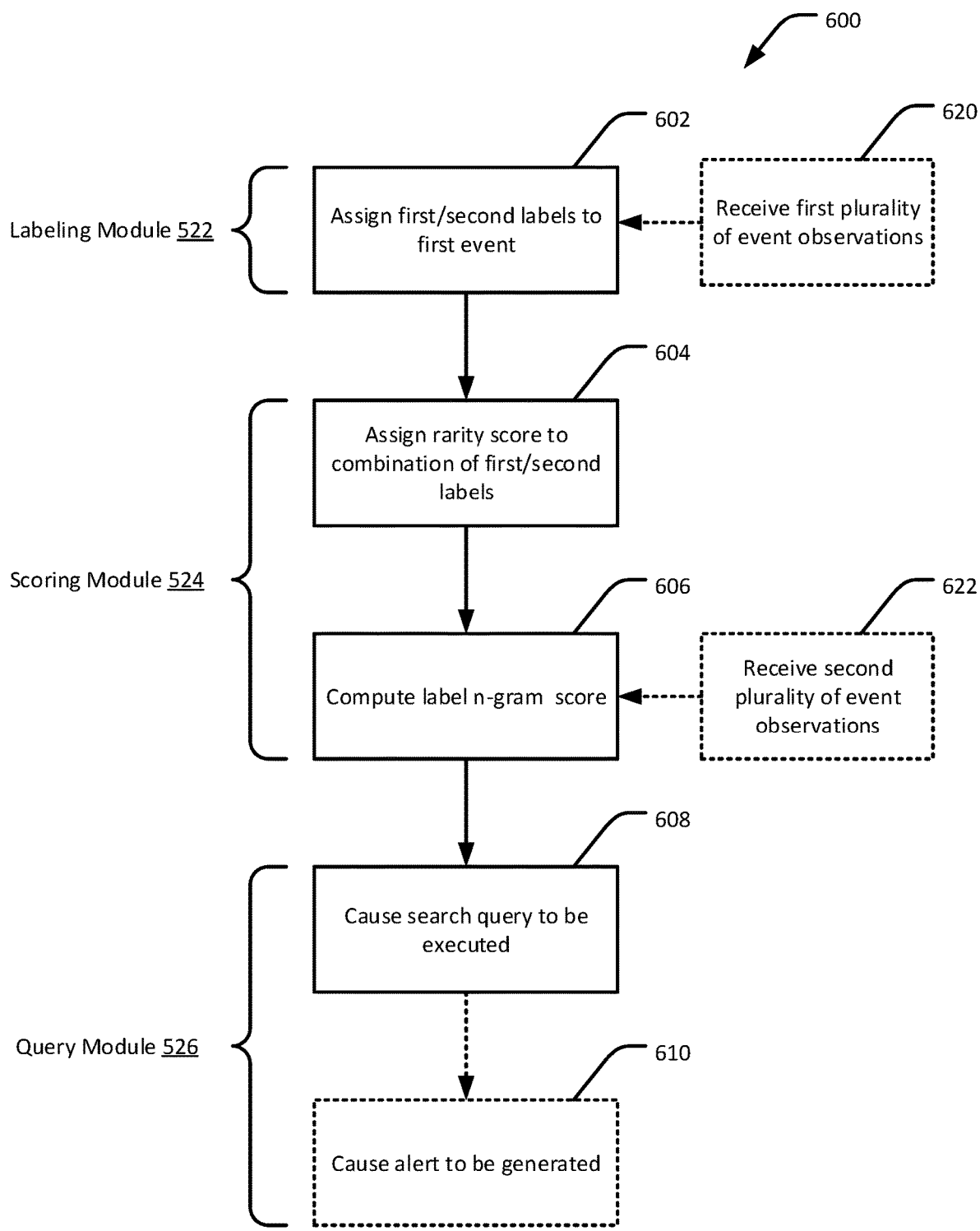
FIGS. 6-8 each show a flow diagram of an example anomaly detection process that can be carried out by the risk-based alerting system of FIG. 5, in accordance with an embodiment of the present disclosure.

FIG. 6 is a flow diagram of an example method 600 for risk-based alerting, in accordance with an embodiment of the present disclosure. The method 600 can be implemented, for example, on the computing device 510 of FIG. 5. The method 600 includes assigning 602, by the labeling module 522 and according to a labeling model (e.g., the labeling model 208 of FIGS. 2-3), a first label and a second label to at least one first computer event (e.g., the labels 104a ... 104n of FIGS. 1-3) based on a first attribute and a second attribute of the first computer event(s). The labeling model is configured to determine, from a first plurality of computer event observations including the first computer event(s), a frequency at which the first computer event(s) occurs at a computing node, and to generate labels including information about the event frequency (e.g., rare, first occurrence, etc.). Examples of the first and second labels include:

| | |
|---|---|
| FIRST_TIME_SEEN_ANOMALY | Applied to newly observed command lines based on historical data |
| RARE_OUTBOUND_CONNECTION | Applies if a process generates an outbound connection to a host that appears in less than 1% of the historical data |
| RARE_LISTENING_PORT | Applied for a process that opens a listening port and, based on past observations, the listening port is used in less than 1% of the data |
| CMD_ENTROPY | Based on the perplexity of the command line, which is computed using a trigram language model (LM) with simple interpolation smoothing - corpora-wide statistics for perplexity ($\mu$ and $\sigma$) can be used as follows: MEDIUM if perplexity is between ($\mu + \sigma$, $\mu + 2\sigma$); HIGH if perplexity is between ($\mu + 2\sigma$, $\mu + 4\sigma$); and EXTREME if perplexity is larger than $\mu + 4\sigma$ |
| RARE_PROCESS_PATH | Applied if the process is launched from an atypical location (fewer than 1% of the instances of the process are executed from this location) |
| RARE_PARENT | Applied if the process has had the given parent process in fewer than 1% of the observations |
| RARE_USER_PROCESS_PAIR | Applied if the specific user has executed the current process in fewer than 1% of the observations (may apply to known system users "mysql", "root", "www-data", "postgresql", "idap", etc. |
| ENV_RARE_PATH | Applied when the PATH environment variable is empty or missing for a specific process and if the variable was present and non-empty for more than 95% of all instances for that specific process, based on historical observations |
| ENV_RARE_LD_LIBRARY_PATH | Similar to ENV_RARE_PATH |
| ENV_MISSING_LD_LIBRARY_PATH | Similar to ENV_MISSING_PATH |
| ENV_RARE_PWD | Similar to ENV_RARE_PATH |
| ENV_MISSING_PWD | Similar to ENV_MISSING_PATH |
| USER_CMD | Applied if the user that launched a command |

| | |
|---|---|
| CMD_<command> | that is not on a list of known system users<br>Multipurpose label used in conjunction with a list of applications/command line tools; dynamically generated for a given command line interface command |
| PATH_<path> | Multipurpose label based on a defined list of system paths that might appear inside the text body of an executed command (e.g., /dev/mem, /dev/tcp, /dev/kmem, /etc/hostname, /etc/ssh/sshd*, etc.) |
| PARENT_<parent_name> | Applied to highlight events that are executed by certain parents (e.g., apache, nginx, httpd, cupsd, mysqld, etc.) |
| IP_<PUBLIC\|PRIVATE> | Applied when the event is generated by a process that establishes an outbound connection and/or when the command line contains one or more character sequences representing IPs (classified as PUBLIC or PRIVATE) |
| REF_LOCALHOST | Applied to events where the localhost component is referenced |
| PROCESS_APPEARS_LESS_THAN_N_TIMES | Applied when a process appears less than N times |

The method 600 further includes assigning 604, by the scoring module 524 and according to a risk-based scoring model (e.g., the risk-based scoring model 214 of FIGS. 2-3), a rarity score to a combination of the first label and the second label a probability of a second computer event having the first attribute and the second attribute occurring in the first plurality of computer event observations. For example, the rarity score can be assigned to a combination of the first label and the second label, where the rarity score represents a number of previously observed instances of the first and/or second computer events having the same attributes. The more frequently the first and second computer events occur, the lower the rarity score will be. Thus, a high rarity score indicates that the first and second computer events have been observed to occur very rarely. In some examples, the rarity score is the negative logarithm of the probability −log(P).

The method 600 further includes computing 606, by the scoring module 524, a label n-gram score by summing the rarity score assigned to the combination of the first label and the second label for each instance of at least one third computer event having the first attribute and the second attribute in a second plurality of computer event observations. For example, if the third computer event occurs five times within the second plurality of computer event observations, the label n-gram score will be the rarity score assigned to the combination of the first label and the second label multiplied by five (once for each instance of the third computer event).

The method 600 further includes causing 608, by the query module 526, a search query to be executed against a risk-based alerting database, the search query being based at least in part on the label n-gram score, the first label, and the second label. RBA is a technique for increasing the accuracy and informative content of alerts by raising the risk profile of users or assets. The risk-based alerting database includes an inventory of alerts that correspond to predefined events, which are associated with the rarity scores. In accordance with various embodiments, correlations between actions, such as described by the bigrams and trigrams described herein, in combination with the label n-gram scores are used to raise alerts for events that have an increased risk of being suspect or otherwise anomalous, thereby increasing the accuracy or relevancy of the alerts. This allows administrators to focus investigations on the users or assets with high risk profiles.

In some embodiments, the method 600 further includes causing 610, by the query module 526, an alert to be generated based on a result of the search query. The result of the search query represents a description of a security risk associated with the first, second, or third computer event. For example, the alert for a rare user process pair co-occurrence can include information about the user and the processes executed by the user, which assists the administrator with further investigation into the events that caused the alert to be generated.

In some embodiments, the method 600 includes computing 606 the label n-gram score based on the negative logarithm of (1/(a number of n-grams including the first label and the second label+1). In some embodiments, the method 600 includes receiving 620, 622 the first computer event, the second computer event, and/or the third computer event from the same computing device or system (e.g., the computing node 102 of FIG. 1) as part of the first and/or second plurality of computer event observations.

Figure 7:
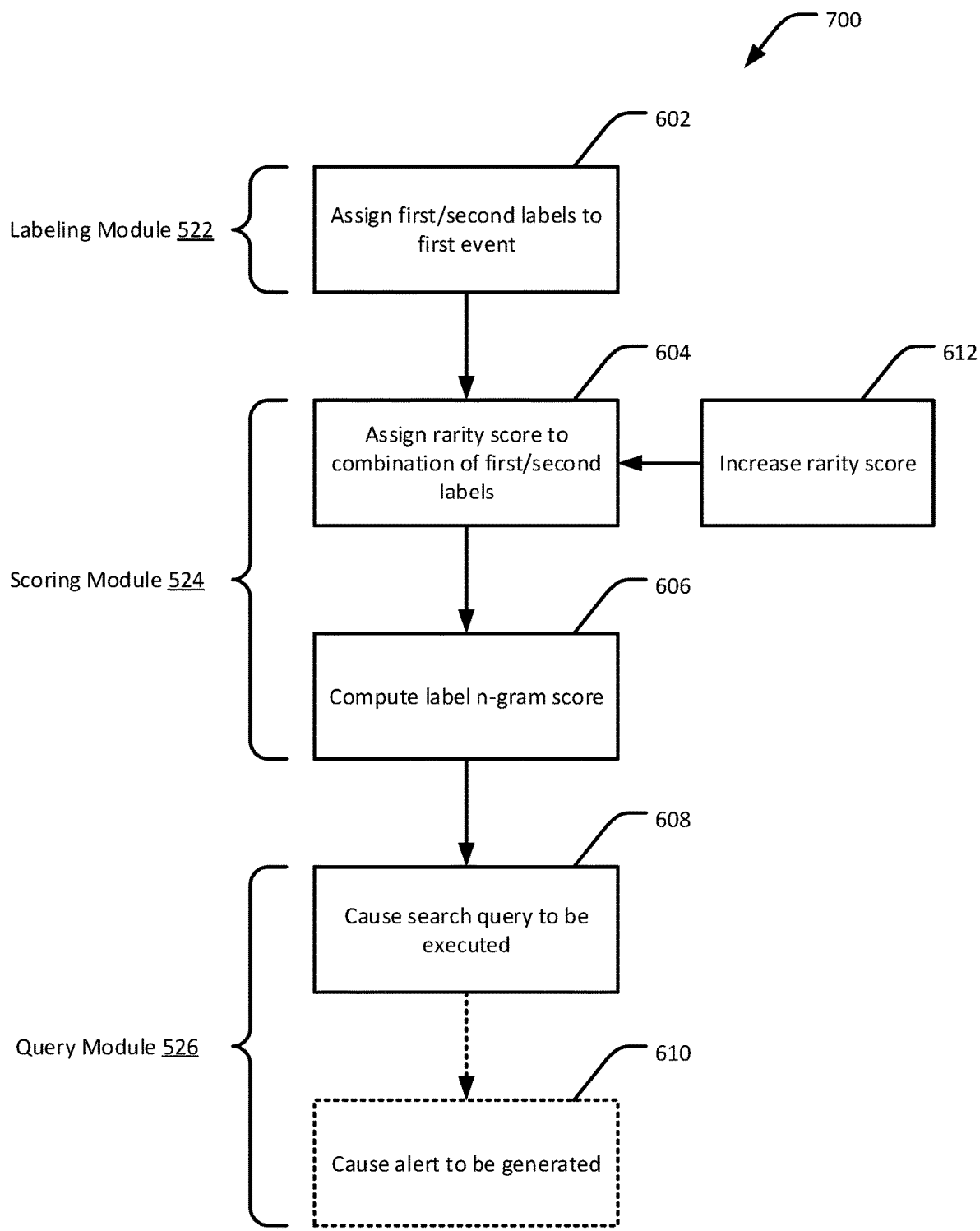

FIG. 7 is a flow diagram of another example method 700 for risk-based alerting, in accordance with an embodiment of the present disclosure. The method 700 can be implemented, for example, on the computing device 510 of FIG. 5. The method 700 is similar to the method 600 of FIG. 6, and further includes increasing 612, by the scoring module 524, the rarity score by a constant value responsive to the third computer event. For example, if netcat is actually a rare command, the rarity score can be increased by a large value (e.g., risk=risk+100). By contrast, if netcat is frequently used by administrators, the increase in the rarity score can be small (e.g., risk=risk+0.001).

Figure 8:
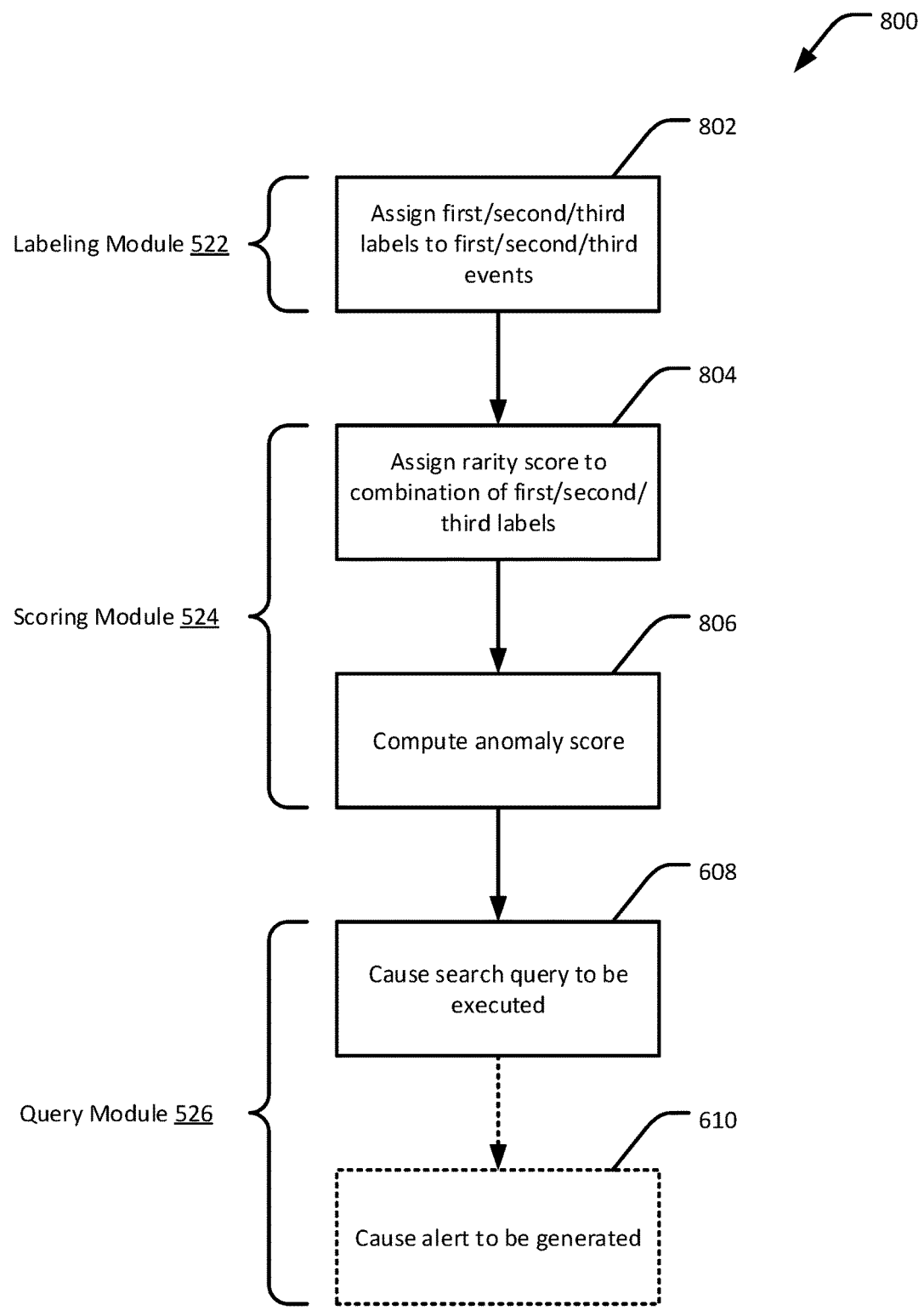

FIG. 8 is a flow diagram of another example method 800 for risk-based alerting, in accordance with an embodiment of the present disclosure. The method 800 can be implemented, for example, on the computing device 510 of FIG. 5. The method 800 is similar to the method 600 of FIG. 6, and further includes computing assigning 802, by the labeling module 522, a third label to a third computer event, the labeling model configured to determine a frequency at which the third computer event occurs at the computing node. The method 800 further includes assigning 804, by the scoring module 524, the rarity score to a combination of the first label, the second label, and the third label based on a probability of a fourth computer event having the first attribute, the second attribute, and the third attribute occurring in the second plurality of computer event observations. The method 800 further includes computing 806, by the scoring module 524, the label n-gram score by summing the rarity score assigned to the combination of the first label, the second label, and the third label for each instance of the at least one third computer event in the second plurality of computer event observations over the pre-determined period of time. In this case, the search query is further based at least in part on the first, second, and third labels.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

FURTHER EXAMPLES

Example 1 provides a method for risk-based alerting. The method includes receiving, from a computing node, a first plurality of computer event observations including at least one first computer event having a first attribute and a second attribute; assigning, according to a labeling model, a first label and a second label to the at least one first computer event based on the first attribute and the second attribute, the labeling model configured to determine, from the first plurality of computer event observations, a frequency at which the at least one first computer event occurs at the computing node; assigning, according to a risk-based scoring model, a rarity score to a combination of the first label and the second label based on a probability of a second computer event having the first attribute and the second attribute occurring in the first plurality of computer event observations; receiving, from the computing node, a second plurality of computer event observations including at least one third computer event with the first attribute and the second attribute; computing, according to the risk-based scoring model, a label n-gram score by summing the rarity score assigned to the combination of the first label and the second label for each instance of the at least one third computer event in the second plurality of computer event observations over a pre-determined period of time; and causing a search query to be executed against a risk-based alerting database, the search query being based at least in part on the label n-gram score.

Example 2 includes the subject matter of Example 1, further including causing an alert to be generated based on a result of the search query, the result representing a description of a security risk associated with the at least one third computer event.

Example 3 includes the subject matter of any of Examples 1-2, where the rarity score is the negative logarithm of the probability.

Example 4 includes the subject matter of any of Examples 1-3, further including increasing the rarity score by a constant value responsive to the third computer event.

Example 5 includes the subject matter of any of Examples 1-4, further including assigning, according to the labeling model, a third label to the third computer event, the labeling model configured to determine a frequency at which the third computer event occurs at the computing node; assigning, according to the risk-based scoring model, the rarity score to a combination of the first label, the second label, and the third label based on the a probability of a fourth computer event having the first attribute, the second attribute, and the third attribute occurring in the second plurality of computer event observations; and computing, according to the risk-based scoring model, the label n-gram score by summing the rarity score assigned to the combination of the first label, the second label, and the third label for each instance of the at least one third computer event in the second plurality of computer event observations over the predetermined period of time, where the search query is further based at least in part on the third label.

Example 6 includes the subject matter of any of Examples 1-5, further including computing the label n-gram score based on the negative logarithm of (1/(a number of n-grams including the first label and the second label+1).

Example 7 includes the subject matter of any of Examples 1-6, further including computing a perplexity of computer events in the first plurality of computer event observations, where the first label includes the perplexity.

Example 8 provides a system for risk-based alerting. The system includes at least one processor; a labeling module, executable by the at least one processor, and configured to assign a first label and a second label to at least one first computer event based on a first attribute and a second attribute of the at least one first computer event, the labeling model configured to determine, from a first plurality of computer event observations, a frequency at which the at least one first computer event occurs at the computing node; a scoring module, executable by the at least one processor, and configured to assign, according to a risk-based scoring model, a rarity score to a combination of the first label and the second label based on a probability of a second computer event having the first attribute and the second attribute occurring in the first plurality of computer event observations; compute, according to the risk-based scoring model, a label n-gram score by summing the rarity score assigned to the combination of the first label and the second label for each instance of at least one third computer event in a second plurality of computer event observations over a pre-determined period of time; and a query module, executable by the at least one processor, and configured to cause a search query to be executed against a risk-based alerting database, the search query being based at least in part on the label n-gram score.

Example 9 includes the subject matter of Example 8, where the query module is further configured to cause an alert to be generated based on a result of the search query, the result representing a description of a security risk associated with the at least one third computer event.

Example 10 includes the subject matter of any of Examples 8-9, where the rarity score is the negative logarithm of the probability.

Example 11 includes the subject matter of any of Examples 8-10, where the scoring module is further configured to increasing the rarity score by a constant value responsive to the third computer event.

Example 12 includes the subject matter of any of Examples 8-11, where the labeling module is further configured to assign, according to the labeling model, a third label to the third computer event, the labeling model configured to determine a frequency at which the third computer event occurs at the computing node, where the scoring module is further configured to assign, according to the risk-based scoring model, the rarity score to a combination of the first label, the second label, and the third label based on the a probability of a fourth computer event having the first attribute, the second attribute, and the third attribute occurring in the second plurality of computer event observation, and compute, according to the risk-based scoring model, the label n-gram score by summing the rarity score assigned to the combination of the first label, the second label, and the third label for each instance of the at least one third computer event in the second plurality of computer event observations over the pre-determined period of time, and where the search query is further based at least in part on the third label.

Example 13 includes the subject matter of any of Examples 8-12, where the scoring module is further configured to compute the label n-gram score based on the negative logarithm of (1/(a number of n-grams including the first label and the second label+1).

Example 14 includes the subject matter of any of Examples 8-13, where the labeling module is further configured to compute a perplexity of computer events in the first plurality of computer event observations, and where the first label includes the perplexity.

Example 15 provides a computer program product including one or more non-transitory machine-readable mediums having instructions encoded thereon that when executed by at least one processor cause a process to be carried out for computer security anomaly detection, the process including receiving, from a computing node, a first plurality of computer event observations including at least one first computer event having a first attribute and a second attribute; assigning, according to a labeling model, a first label and a second label to the at least one first computer event based on the first attribute and the second attribute, the labeling model configured to determine, from the first plurality of computer event observations, a frequency at which the at least one first computer event occurs at the computing node; assigning, according to a risk-based scoring model, a rarity score to a combination of the first label and the second label based on a probability of a second computer event having the first attribute and the second attribute occurring in the first plurality of computer event observations; receiving, from the computing node, a second plurality of computer event observations including at least one third computer event with the first attribute and the second attribute; computing, according to the risk-based scoring model, a label n-gram score by summing the rarity score assigned to the combination of the first label and the second label for each instance of the at least one third computer event in the second plurality of computer event observations over a pre-determined period of time; and causing a search query to be executed against a risk-based alerting database, the search query being based at least in part on the label n-gram score.

Example 16 includes the subject matter of Example 15, where the process further includes causing an alert to be generated based on a result of the search query, the result representing a description of a security risk associated with the at least one third computer event.

Example 17 includes the subject matter of any of Examples 15-16, where the rarity score is the negative logarithm of the probability.

Example 18 includes the subject matter of any of Examples 15-17, where the process further comprises increasing the rarity score by a constant value responsive to the third computer event.

Example 19 includes the subject matter of any of Examples 15-18, where the process further includes assigning, according to the labeling model, a third label to the third computer event, the labeling model configured to determine a frequency at which the third computer event occurs at the computing node; assigning, according to the risk-based scoring model, the rarity score to a combination of the first label, the second label, and the third label based on the a probability of a fourth computer event having the first attribute, the second attribute, and the third attribute occurring in the second plurality of computer event observations; and computing, according to the risk-based scoring model, the label n-gram score by summing the rarity score assigned to the combination of the first label, the second label, and the third label for each instance of the at least one third computer event in the second plurality of computer event observations over the predetermined period of time, where the search query is further based at least in part on the third label.

Example 20 includes the subject matter of any of Examples 15-19, where the process further includes computing the label n-gram score based on the negative logarithm of (1/(a number of n-grams including the first label and the second label+1).

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It will be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for risk-based alerting, the method comprising:

receiving, from a computing node, a first plurality of computer event observations including at least one first computer event having a first attribute and a second attribute;

assigning, according to a labeling model, a first label and a second label to the at least one first computer event having the first attribute and the second attribute, the labeling model configured to determine, from the first plurality of computer event observations, a frequency at which the at least one first computer event occurs at the computing node;

the labeling model further configured to determine, based on the frequency, an n-gram of the first label and the second label;

assigning, according to a risk-based scoring model, a rarity score to the n-gram of the first label and the second label, the rarity score based on a probability of a second computer event having the first attribute and the second attribute occurring in the first plurality of computer event observations;

receiving, from the computing node, a second plurality of computer event observations including at least one third computer event having the first attribute and the second attribute;

assigning, according to the labeling model, the n-gram of the first label and the second label to the at least one third computer event;

computing, according to the risk-based scoring model, a label n-gram score by multiplying the rarity score by a number of instances of the at least one third computer event in the second plurality of computer event observations that are assigned the n-gram of the first label and the second label; and causing a search query to be executed against a risk-based alerting database, the search query being based at least in part on the label n-gram score.

2. The method of claim 1, further comprising causing an alert to be generated based on a result of the search query, the result representing a description of a security risk associated with the at least one third computer event.

3. The method of claim 1, wherein the rarity score is the negative logarithm of the probability.

4. The method of claim 1, further comprising increasing the rarity score by a constant value responsive to the third computer event.

5. The method of claim 1, further comprising:
assigning, according to the labeling model, a third label to the third computer event, the labeling model configured to determine a frequency at which the third computer event occurs at the computing node;
assigning, according to the risk-based scoring model, the rarity score to an n-gram of the first label, the second label, and the third label, the rarity score further based on a probability of a fourth computer event having the first attribute, the second attribute, and the third attribute occurring in the second plurality of computer event observations; and
computing, according to the risk-based scoring model, the label n-gram score by further multiplying the rarity score by a number of instances of the at least one third computer event in the second plurality of computer event observations that are assigned the n-gram of the first label, the second label, and the third label,
wherein the search query is further based at least in part on the third label.

6. The method of claim 1, further comprising computing the label n-gram score based on the negative logarithm of (1/(a number of n-grams including the first label and the second label+1).

7. The method of claim 1, further comprising computing a perplexity of computer events in the first plurality of computer event observations, wherein the first label includes the perplexity.

8. A system for risk-based alerting, the system comprising:
at least one hardware processor;
a labeling module, executable by the at least one hardware processor, and configured to assign, according to a labeling model, a first label and a second label to at least one first computer event having a first attribute and a second attribute of the at least one first computer event, the labeling model configured to determine, from a first plurality of computer event observations, a frequency at which the at least one first computer event occurs at a computing node, the labeling model further configured to determine, based on the frequency, an n-gram of the first label and the second label; and to assign the n-gram of the first label and the second label to at least one third computer event in a second plurality of computer event observations, the at least one third computer event having the first attribute and the second attribute;

a scoring module, executable by the at least one hardware processor, and configured to
assign, according to a risk-based scoring model, a rarity score to the n-gram of the first label and the second label, the rarity score based on a probability of a second computer event having the first attribute and the second attribute occurring in the first plurality of computer event observations;
compute, according to the risk-based scoring model, a label n-gram score by multiplying the rarity score by a number of instances of the at least one third computer event in the second plurality of computer event observations that are assigned the n-gram of the first label and the second label; and a query module, executable by the at least one hardware processor, and configured to cause a search query to be executed against a risk-based alerting database, the search query being based at least in part on the label n-gram score.

9. The system of claim 8, wherein the query module is further configured to cause an alert to be generated based on a result of the search query, the result representing a description of a security risk associated with the at least one third computer event.

10. The system of claim 8, wherein the rarity score is the negative logarithm of the probability.

11. The system of claim 8, wherein the scoring module is further configured to increasing the rarity score by a constant value responsive to the third computer event.

12. The system of claim 8,
wherein the labeling module is further configured to assign, according to the labeling model, a third label to the third computer event, the labeling model configured to determine a frequency at which the third computer event occurs at the computing node,
wherein the scoring module is further configured to
assign, according to the risk-based scoring model, the rarity score to an n-gram of the first label, the second label, and the third label, the rarity score further based on a probability of a fourth computer event having the first attribute, the second attribute, and the third attribute occurring in the second plurality of computer event observation, and
compute, according to the risk-based scoring model, the label n-gram score by further multiplying the rarity score by a number of instances of the at least one third computer event in the second plurality of computer event observations that are assigned the n-gram of the first label, the second label, and the third label, and
wherein the search query is further based at least in part on the third label.

13. The system of claim 8, wherein the scoring module is further configured to compute the label n-gram score based on the negative logarithm of (1/(a number of n-grams including the first label and the second label+1).

14. The system of claim 8, wherein the labeling module is further configured to compute a perplexity of computer events in the first plurality of computer event observations, and wherein the first label includes the perplexity.

15. A computer program product including one or more non-transitory machine-readable mediums having instructions encoded thereon that when executed by at least one processor cause a process to be carried out for computer security anomaly detection, the process comprising:
- receiving, from a computing node, a first plurality of computer event observations including at least one first computer event having a first attribute and a second attribute;
- assigning, according to a labeling model, a first label and a second label to the at least one first computer event having the first attribute and the second attribute, the labeling model configured to determine, from the first plurality of computer event observations, a frequency at which the at least one first computer event occurs at the computing node;
- the labeling model further configured to determine, based on the frequency, an n-gram of the first label and the second label;
- assigning, according to a risk-based scoring model, a rarity score to the n-gram of the first label and the second label, the rarity score based on a probability of a second computer event having the first attribute and the second attribute occurring in the first plurality of computer event observations;
- receiving, from the computing node, a second plurality of computer event observations including at least one third computer event having the first attribute and the second attribute;
- assigning, according to the labeling model, the n-gram of the first label and the second label to the at least one third computer event;
- computing, according to the risk-based scoring model, a label n-gram score by multiplying the rarity score by a number of instances of the at least one third computer event in the second plurality of computer event observations that are assigned the n-gram of the first label and the second label; and
- causing a search query to be executed against a risk-based alerting database, the search query being based at least in part on the label n-gram score.

16. The computer program product of claim 15, wherein the process further comprises causing an alert to be generated based on a result of the search query, the result representing a description of a security risk associated with the at least one third computer event.

17. The computer program product of claim 15, wherein the rarity score is the negative logarithm of the probability.

18. The computer program product of claim 15, wherein the process further comprises increasing the rarity score by a constant value responsive to the third computer event.

19. The computer program product of claim 15, wherein the process further comprises:
- assigning, according to the labeling model, a third label to the third computer event, the labeling model configured to determine a frequency at which the third computer event occurs at the computing node;
- assigning, according to the risk-based scoring model, the rarity score to an n-gram of the first label, the second label, and the third label, the rarity score further based on a probability of a fourth computer event having the first attribute, the second attribute, and the third attribute occurring in the second plurality of computer event observations; and
- computing, according to the risk-based scoring model, the label n-gram score by further multiplying the rarity score by a number of instances of the at least one third computer event in the second plurality of computer event observations that are assigned the n-gram of the first label, the second label, and the third label,
- wherein the search query is further based at least in part on the third label.

20. The computer program product of claim 15, wherein the process further comprises computing the label n-gram score based on the negative logarithm of (1/(a number of n-grams including the first label and the second label+1).

* * * * *